United States Patent
Kim et al.

(10) Patent No.: US 8,839,064 B2
(45) Date of Patent: Sep. 16, 2014

(54) COMMUNICATION SYSTEM AND METHOD FOR TRANSMITTING OR RECEIVING PACKETS THEREIN

(75) Inventors: Hyun Seok Kim, Suwon-si (KR); Young Sung Kho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 12/612,845

(22) Filed: Nov. 5, 2009

(65) Prior Publication Data
US 2010/0122137 A1 May 13, 2010

(30) Foreign Application Priority Data
Nov. 7, 2008 (KR) .................. 10-2008-0110180

(51) Int. Cl.
G06F 11/00 (2006.01)
H04L 1/18 (2006.01)

(52) U.S. Cl.
CPC .................................. *H04L 1/1867* (2013.01)
USPC .......................................... 714/748; 714/749

(58) Field of Classification Search
CPC ............ H04W 72/1284; H04W 72/04; H04W 72/042; H04W 24/02; H04W 28/04; H04W 28/06; H04W 72/02; H04W 72/0413; H04W 72/12; H04W 80/02; H04W 88/08
USPC ......................................................... 714/748
See application file for complete search history.

(56) References Cited

U.S. PATENT DOCUMENTS

| | | | | |
|---|---|---|---|---|
| 7,130,295 B2* | 10/2006 | Kim et al. | ...................... | 370/349 |
| 7,286,563 B2* | 10/2007 | Chang et al. | .................. | 370/469 |
| 2002/0172208 A1* | 11/2002 | Malkamaki | ................... | 370/400 |
| 2003/0007480 A1* | 1/2003 | Kim et al. | ...................... | 370/349 |
| 2003/0016698 A1* | 1/2003 | Chang et al. | .................. | 370/469 |
| 2005/0039101 A1* | 2/2005 | Torsner | ......................... | 714/748 |
| 2007/0168826 A1* | 7/2007 | Terry et al. | .................... | 714/748 |
| 2007/0177630 A1* | 8/2007 | Ranta et al. | ................... | 370/473 |
| 2008/0146214 A1* | 6/2008 | Kim et al. | .................. | 455/422.1 |
| 2009/0172490 A1* | 7/2009 | Shinohara et al. | ............ | 714/748 |
| 2010/0067481 A1* | 3/2010 | Maeda | ............................ | 370/331 |
| 2010/0257423 A1* | 10/2010 | Kim | ............................. | 714/749 |
| 2010/0296431 A1* | 11/2010 | Terry et al. | .................... | 370/315 |
| 2010/0318869 A1* | 12/2010 | Kashima | ........................ | 714/748 |

* cited by examiner

*Primary Examiner* — Bryce Bonzo
*Assistant Examiner* — Elmira Mehrmanesh
(74) *Attorney, Agent, or Firm* — Jefferson IP Law, LLP

(57) ABSTRACT

A communication system and a method for transmitting or receiving packets are provided. The method includes transmitting the packet from a transmitting Radio Link Control (RLC) entity to a receiving node via a transmitting Medium Access Control (MAC) entity, transmitting an Hybrid Automatic ReQuest (HARQ) failure signal from the transmitting MAC entity to the transmitting RLC entity if the transmitting MAC entity receives a HARQ Negative ACKnowledgment (NACK) signal from the receiving node, and re-transmitting the packet from the transmitting RLC entity to the receiving node via the transmitting MAC entity if the transmitting RLC entity receives the HARQ failure signal.

17 Claims, 7 Drawing Sheets

COMMUNICATION SYSTEM AND METHOD FOR TRANSMITTING OR RECEIVING PACKETS THEREIN

PRIORITY

This application claims the benefit under 35 U.S.C. §119(a) of a Korean patent application filed in the Korean Intellectual Property Office on Nov. 7, 2008 and assigned Serial No. 10-2008-0110180, the entire disclosure of which is hereby incorporated by reference.

BACKGROUND OF THE INVENTION

1. Field of the Invention

The present invention relates to communication technology. More particularly, the present invention relates to a communication system and a method for transmitting or receiving packets in the communication system.

2. Description of the Related Art

Universal Mobile Telecommunication Service (UMTS) systems refer to a 3rd generation asynchronous mobile communication system that is based on Global System for Mobile communications (GSM) and General Packet Radio Service (GPRS), and uses Code Division Multiple Access (CDMA). A 3rd Generation Partnership Project (3GPP) responsible for standardizing the UMTS proposes an Evolved Packet System (EPS), such as a Long Term Evolution (LTE) system. The EPS is designed to perform transmission and reception of packets at a high speed and high quality.

Conventional communication systems employ an error correction, such as a Hybrid Automatic ReQuest (HARQ) and an Automatic Repeat reQuest (ARQ). The HARQ refers to an error control method where a packet receiver receives a packet from a packet transmitter, verifies whether the received packet has an error, and, if the received packet has an error, verifies retransmission of the packet from the packet transmitter. The packet receiver soft-combines the packet to reduce a possible error occurrence. The ARQ refers to an error control method that requests re-transmission of the packet from the packet transmitter, if the packet receiver did not receive a requested packet from the packet transmitter. That is, the conventional communication system recovers the packet using the HARQ and the ARQ if the packet is lost during the transmission from the transmitter to the receiver.

When the conventional communication system performs the transmission or reception of a packet using the HARQ or the ARQ, the conventional communication system delays the transmission or reception time of the packet. Accordingly, the resources of the communication system are wasted, and thus the communication system is unable to retain a relatively high level of service.

Therefore, a need exists for a communication system and method for transmitting or receiving packets with a high level of service.

SUMMARY OF THE INVENTION

An aspect of the present invention is to address at least the above-mentioned problems and/or disadvantages and to provide at least the advantages described below. Accordingly, an aspect of the present invention is to provide a communication system that performs transmission or reception of packets without delay and provides a high level of service.

Another aspect of the present invention is to provide a method for performing transmission or reception of packets in a communication system without delay.

In accordance with an aspect of the present invention, the present invention provides a method for transmitting or receiving a packet in a communication system that includes a transmitting node and a receiving node, in which the transmitting node includes a transmitting Radio Link Control (RLC) entity for performing an Automatic Repeat reQuest (ARQ) operation and a transmitting Medium Access Control (MAC) entity for performing a Hybrid Automatic ReQuest (HARQ) operation. The method includes transmitting the packet from the transmitting RLC entity to the receiving node via the transmitting MAC entity, transmitting a HARQ failure signal from the transmitting MAC entity to the transmitting RLC entity, if the transmitting MAC entity receives a HARQ Negative ACKnowledgment (NACK) signal from the receiving node, and re-transmitting the packet from the transmitting RLC entity to the receiving node via the transmitting MAC entity, if the transmitting RLC entity receives the HARQ failure signal.

In accordance with another aspect of the present invention, the present invention provides a communication system for performing the transmission or reception of a packet. The system includes a transmitting node including a transmitting Radio Link Control (RLC) entity for performing an Automatic Repeat reQuest (ARQ) operation, a transmitting Medium Access Control (MAC) entity for performing a Hybrid Automat ReQuest (HARQ) operation, in which the transmitting RLC entity transmits the packet through the transmitting MAC entity, and a receiving node for receiving the packet from the transmitting node, for determining whether the received packet is lost, and for transmitting a HARQ Negative ACKnowledgment (NACK) signal to the transmitting MAC entity if the received packet is lost. The transmitting MAC entity receives the HARQ NACK signal and transmits a HARQ failure signal to the transmitting RLC entity, and the transmitting RLC entity receives the HARQ failure signal and re-transmits the packet to the receiving node via the transmitting MAC entity.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
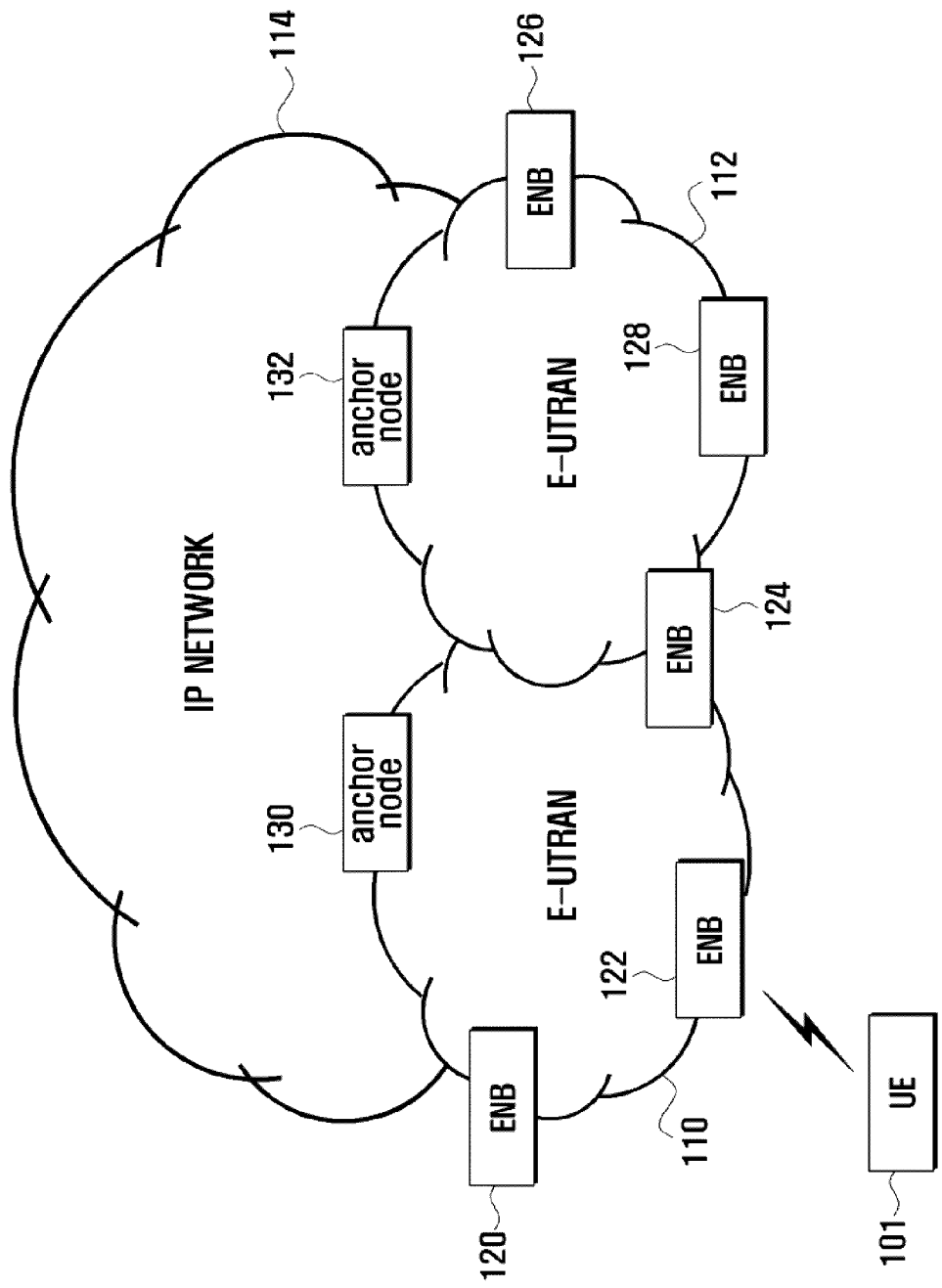
FIG. 1 is a view illustrating a communication system according to an exemplary embodiment of the present invention.

FIG. 1 is a view illustrating a communication system according to an exemplary embodiment of the present invention. In an exemplary implementation, it is assumed herein that the communication system with a Universal Mobile Telecommunication Service (UMTS) system.

Referring to FIG. 1, the communication system includes an Evolved UMTS Radio Access Networks (E_UTRAN) 110 or 112 simplified with a two-node system of evolved Node Bs (eNBs) 120, 122, 124, 126 and 128 and anchor nodes 130 and 132. A User Equipment (UE) 101 is connected to an Internet Protocol (IP) network 114 via the E_UTRAN 110 or 112, for example. The eNBs 120 to 128 are connected to the UE 101 via a radio channel. In a Long Term Evolution (LTE) system, since all user traffic and a real time service, such as a Voice over IP (VoIP) service, are serviced via a shared channel, the eNBs 120 to 128 may collect state information regarding the UE 101 and perform a scheduling. That is, similar to High Speed Downlink Packet Access (HSDPA) or Enhanced uplink Dedicated CHannel (E-DCH), a Hybrid Automatic ReQuest (HARQ) and an Automatic Repeat reQuest (ARQ) are performed between the UE 101 and the eNBs 120 to 128 in the LTE system.

Figure 2:
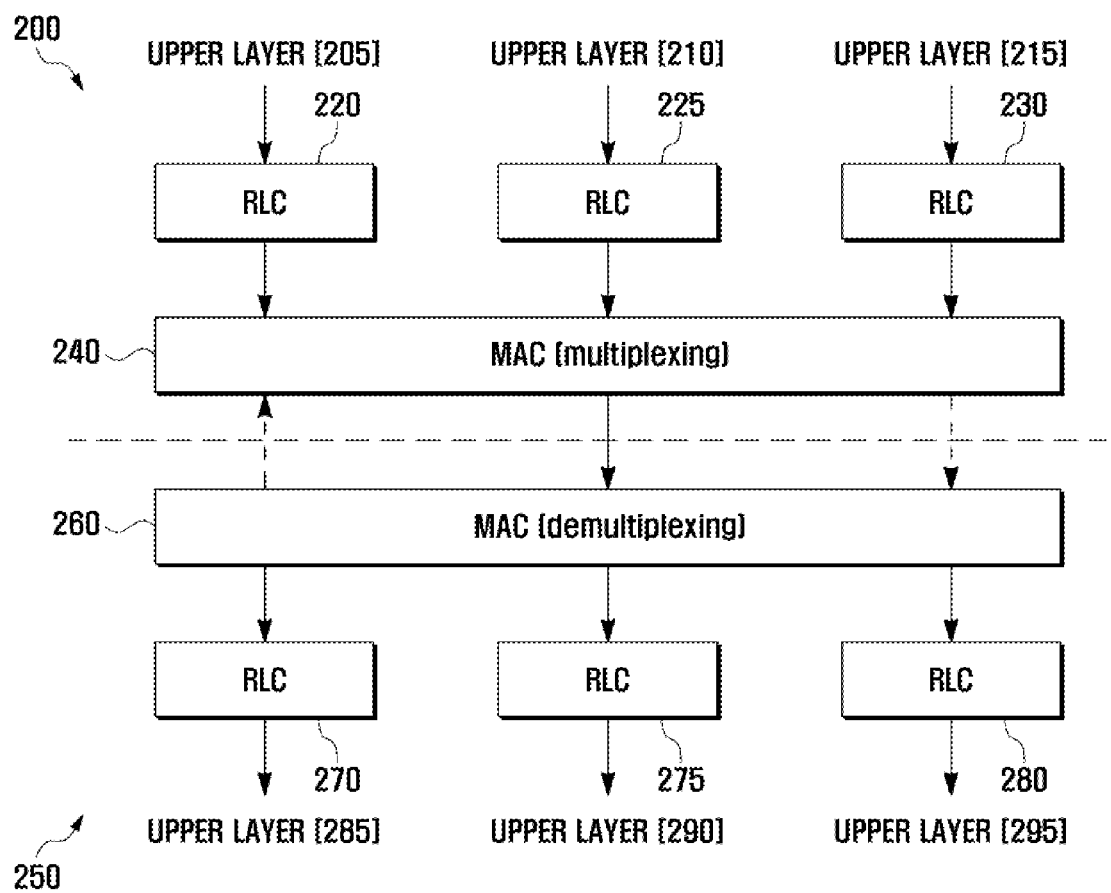
FIG. 2 is a view illustrating a configuration of a protocol layer in a communication system according to an exemplary embodiment of the present invention.

FIG. 2 is a view illustrating a configuration of a protocol layer in a communication system according to an exemplary embodiment of the present invention. In an exemplary implementation, it is assumed herein that the communication system is implemented with an LTE system.

Referring to FIG. 2, protocols of the LTE system are divided into a packet transmitting side 200 and a packet receiving side 250.

At the packet transmitting side 200, the protocol of the LTE system includes transmitting upper layers 205, 210 and 215, transmitting Radio Link Control (RLC) layers 220, 225 and 230 linked to the transmitting upper layers 205, 210 and 215, respectively, and a transmitting Medium Access Control (MAC) layer 240 linked to the transmitting RLC layers 220, 225 and 230. The transmitting upper layers 205, 210 and 215 are configured as a set per service and serve to compress an IP header. The transmitting upper layers 205, 210 and 215 provide packets, i.e., a Service Data Unit (SDU) to the transmitting RLC layers 220, 225 and 230. The transmitting RLC layers 220, 225 and 230 re-configure the SDU from the transmitting upper layers 205, 210 and 215 to an appropriate size in order to generate an RLC Packet Data Unit (PDU), and perform an ARQ with respect to the RLC PDU. The transmitting MAC layer 240 multiplexes the RLC PDU to generate a MAC PDU. The transmitting MAC layer 240 performs a HARQ with respect to the MAC PDU and then transmits the MAC PDU.

At the packet receiving side 250, the protocol of the LTE system includes receiving upper layers 285, 290 and 295, receiving RLC layers 270, 275 and 280 linked to the receiving upper layers 285, 290 and 295, respectively, and a receiving MAC layer 260 linked to the receiving RLC layers 270, 275 and 280. The receiving MAC layer 260 de-multiplexes the MAC PDU from the packet transmitting side 200 and then generates an RLC PDU. That is, the receiving MAC layer 260 separates the received MAC PDU to a plurality of RLC PDU. The receiving RLC layers 210, 275 and 280 process an RLC PDU, respectively, and generate an SDU. The receiving upper layers 285, 290 and 295 are configured as a set per service and serve to recover an IP header.

In an exemplary implementation, the structure of the transmitting RLC layers 220, 225 and 230 or the receiving RLC layers 270, 275 and 280 is described in Table 1 below. The transmitting RLC layers 220, 225 and 230 or the receiving RLC layers 270, 275 and 280 may be operated in one of an Unacknowledged Mode (UM), an Acknowledged Mode (AM) and a Half-acknowledged Mode (HM).

TABLE 1

| RLC-Configuration ::= | CHOICE { |
|---|---|
| am | SEQUENCE { |
|    ul-AM-RLC | UL-AM-RLC, |
|    dl-AM-RLC | DL-AM-RLC |
| }, | |
| HM | SEQUENCE { |
|    ul-HM-RLC | UL-HM-RLC, |
|    dl-HM-RLC | DL-HM-RLC |
| }, | |
| um-Bi-Directional | SEQUENCE { |
|    ul-UM-RLC | UL-UM-RLC, |
|    dl-UM-RLC | DL-UM-RLC |
| }, | |
| um-Uni-Directional-UL | SEQUENCE { |
|    ul-UM-RLC | UL-UM-RLC |
| }, | |
| um-Uni-Directional-DL | SEQUENCE { |
|    dl-UM-RLC | DL-UM-RLC |
| } | |
| } | |

In the following description, a method for transmitting or receiving packets in the communication system, based on the protocols described above, is described in more detail below.

Figure 3:
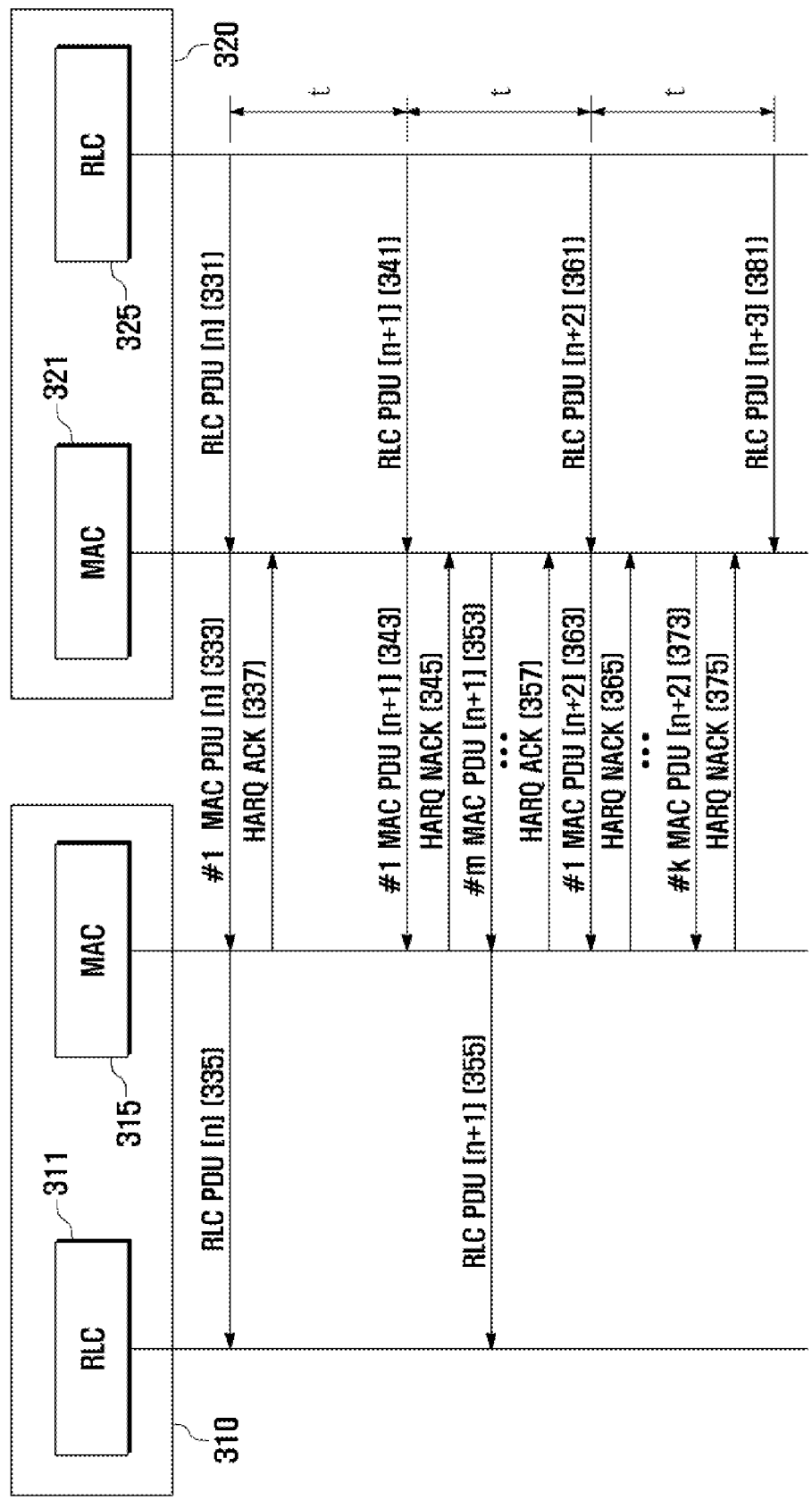
FIG. 3 is a signal flowchart describing a method for transmitting or receiving packets in a communication system according to an exemplary embodiment of the present invention.

FIG. 3 is a signal flowchart describing a method for transmitting or receiving packets in a communication system according to an exemplary embodiment of the present invention. In an exemplary implementation, it is assumed herein that the transmitting RLC layers 220, 225 and 230 or the receiving RLC layers 270, 275 and 280 are operated in an UM.

Referring to FIG. 3, when a transmitting node 320 transmits packets, according to a serial number, to a receiving node 310, the receiving node 310 receives the packets according to the serial number. At the receiving node 310, a receiving RLC entity 311 performs operations of the receiving RLC layers 270, 275 and 280. A receiving MAC entity 315 performs the operation of the receiving MAC layer 260. Similarly, at the transmitting node 320, a transmitting MAC entity 321 performs the operation of the transmitting MAC layer 240, and a transmitting RLC entity 325 performs the operations of the transmitting RLC layers 220, 225 and 230.

At the transmitting node 320, the transmitting RLC entity 325 generates an RLC PDU [n] as a packet and then transmits the RLC PDU [n] to the transmitting MAC entity 321 in step 331. Symbol n denotes a serial number of the RLC PDU that the transmitting node 320 transmits. That is, the RLC PDU [n] refers to a RLC PDU whose serial number is n. The transmitting MAC entity 321 generates a MAC PDU [n] from the received RLC PDU [n], and then transmits the MAC PDU [n], as a first attempt (#1), to the receiving node 310 in step 333. The MAC PDU[n] refers to a MAC PDU that is generated from the RLC PDU whose serial number is n.

At the receiving node 310, if the MAC PDU [n] does not contain an error, the receiving MAC entity 315 generates the RLC PDU [n] from the MAC PDU [n] and then transmits the RLC PDU [n] to the receiving RLC entity 311 in step 335. The receiving MAC entity 315 transmits a HARQ ACKnowledgment (HARQ ACK) signal to the transmitting MAC entity 321 in step 337.

At the transmitting node 320, when a preset packet transmission time t has elapsed from the time point to transmit the RLC PDU [n], the transmitting RLC entity 325 generates an RLC PDU [n+1] as a packet and then transmits the RLC PDU [n+1] to the transmitting MAC entity 321 in step 341. The transmitting MAC entity 321 generates a MAC PDU [n+1] from the received RLC PDU [n+1] and then transmits the MAC PDU [n+1], as the first attempt (#1), to the receiving node 310 in step 343.

At the receiving node 310, if the MAC PDU [n+1] contains an error, the receiving MAC entity 315 transmits a HARQ Negative ACKnowledgment (HARQ NACK) signal to the transmitting MAC entity 321 in step 345.

At the transmitting node 320, if the transmitting MAC entity 321 receives the HARQ NACK signal, the transmitting MAC entity 321 re-transmits the MAC PDU [n+1], as an m-th attempt (#m), to the receiving node 310 in step 353. The symbol m is equal to 2 or greater than 2. The symbol m may be a preset frequency of the HARQ NACK, i.e., equal to or less than a number j.

At the receiving node 310, if the MAC PDU [n+1] does not contain an error, the receiving MAC entity 315 generates the RLC PDU [n+1] from the MAC PDU [n+1] and transmits the RLC PDU [n+1] to the receiving RLC entity 311 in step 355. The receiving MAC entity 315 then transmits a HARQ ACK signal to the transmitting MAC entity 321 in step 357.

At the transmitting node 320, when a preset packet transmission time t has elapsed from the time point to transmit the RLC PDU[n+1], the transmitting RLC entity 325 generates an RLC PDU [n+2] as a packet and then transmits the RLC PDU [n+2] to the transmitting MAC entity 321 in step 361.

The transmitting MAC entity 321 generates a MAC PDU[n+2] from the received RLC PDU [n+2] and then transmits the MAC PDU [n+2], as the first attempt (#1), to the receiving node 310 in step 363.

At the receiving node 310, if the MAC PDU [n+2] contains an error, the receiving MAC entity 315 transmits a HARQ NACK signal to the transmitting MAC entity 321 in step 365.

At the transmitting node 320, if the transmitting MAC entity 321 receives the HARQ NACK signal, the transmitting MAC entity 321 transmits the MAC PDU [n+2], as an k-th attempt (#k), to the receiving node 310 in step 373. The symbol k is equal to 2 or greater than 2. The symbol m may be a preset frequency of the HARQ NACK signal, i.e., equal to or less than a number j.

At the receiving node 310, if the MAC PDU [n+2] contains an error, the receiving MAC entity 315 transmits a HARQ NACK signal to the MAC entity 321 in step 375.

At the transmitting node 320, when a preset packet transmission time t has elapsed from the time point to transmit the RLC PDU[n+2], the transmitting RLC entity 325 generates an RLC PDU [n+3] as a packet and then transmits the RLC PDU [n+3] to the transmitting MAC entity 321 in step 381.

The transmitting RLC entity 325 transmits the RLC PDU [n+3] to the transmitting MAC entity 321 irrespective of whether the transmitting MAC entity 321 receives the HARQ ACK signal. Therefore, the transmitting MAC entity 321 must transmit the MAC PDU [n+2] and a MAC PDU [n+3] to the receiving node 310. Before the transmitting MAC entity 321 re-transmits the MAC PDU [n+2], the transmitting MAC entity 321 may transmit the MAC PDU [n+3] or remove the MAC PDU [n+3].

As described above, when the receiving MAC entity 315 of the receiving node 310 receives the MAC PDU from the transmitting MAC entity of the transmitting node 320; the receiving MAC entity 315 determines whether packet loss occurs in the received MAC PDU. If the receiving MAC entity 315 ascertains that packet loss does not occur in the MAC PDU, the receiving MAC entity 315 transmits a HARQ ACK signal to the transmitting MAC entity. Otherwise, the receiving MAC entity 315 transmits a HARQ NACK to the transmitting MAC entity. The receiving MAC entity 315 may transmit a HARQ NACK signal to the transmitting MAC entity until it receives a MAC PDU that does not contain an error. For example, the receiving MAC entity 315 may transmit a HARQ NACK signal to the transmitting MAC entity from one time to less than j times. The transmitting MAC entity 321 of the transmitting node 320 may re-transmit a MAC PDU to the receiving MAC entity until it receives a HARQ ACK signal therefrom. For example, the transmitting MAC entity 321 may transmit the MAC PDU [n+1] to the receiving MAC entity from one time to less than j times. In an exemplary implementation, the packet transmission is performed irrespective of the packet transmission result of the transmitting RLC entity 325, and the transmitting MAC entity 321 verifies the packet transmission result.

Figure 4:
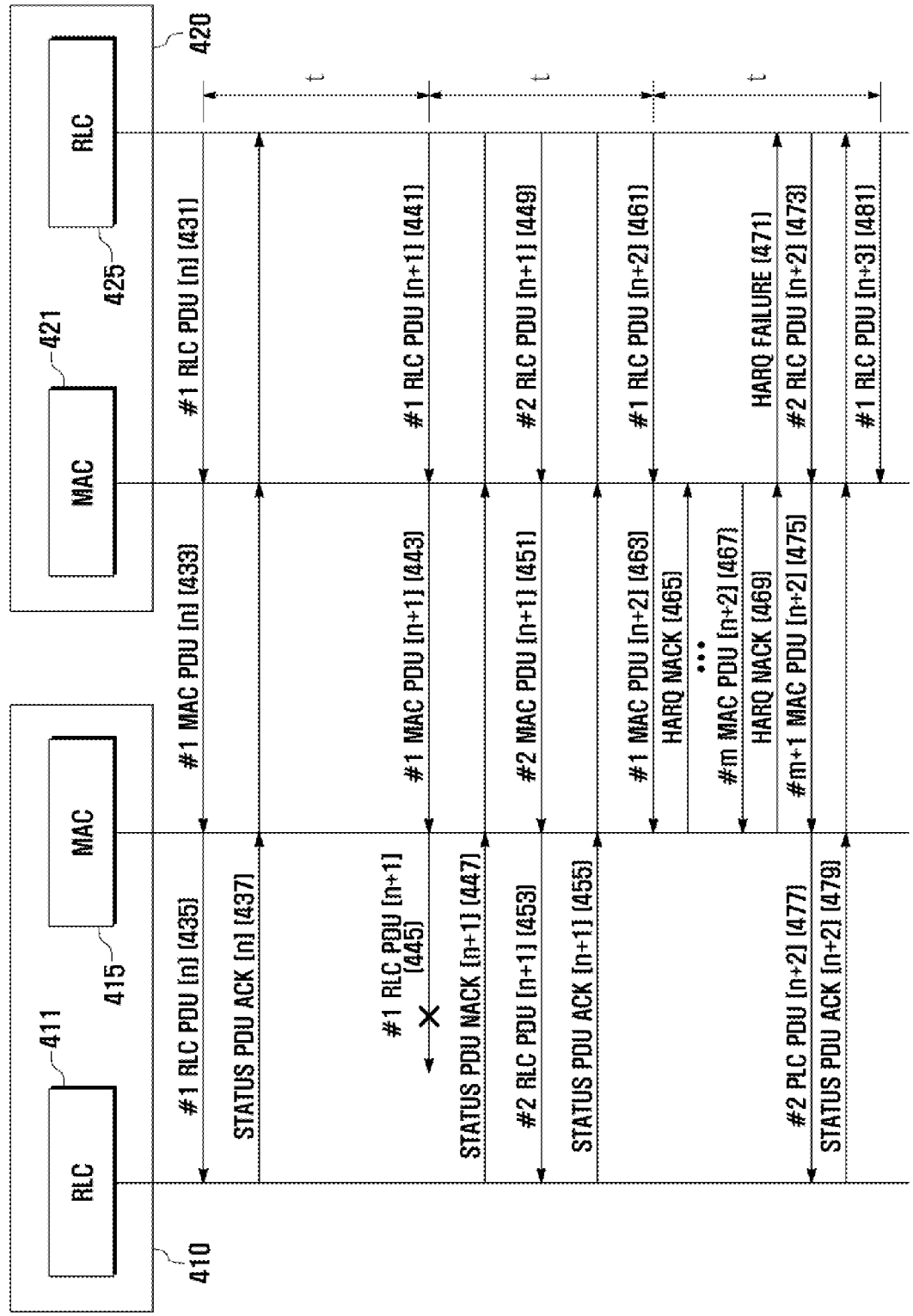
FIG. 4 is a signal flowchart describing a method for transmitting or receiving packets in a communication system according to an exemplary embodiment of the present invention.

FIG. 4 is a signal flowchart describing a method for transmitting or receiving packets in a communication system according to an exemplary embodiment of the present invention. In an exemplary implementation, it is assumed herein that the transmitting RLC layers 220, 225 and 230 or the receiving RLC layers 270, 275 and 280 are operated in an Acknowledged Mode (AM).

Referring to FIG. 4, when a transmitting node 420 transmits packets, according to a serial number, to a receiving node 410, the receiving node 410 receives the packets according to the serial number. At the receiving node 410, a receiving RLC entity 411 performs operations of the receiving RLC layers 270, 275 and 280, and a receiving MAC entity 415 performs the operation of the receiving MAC layer 260. Similarly, at the transmitting node 420, a transmitting MAC entity 421 performs the operation of the transmitting MAC layer 240, and a transmitting RLC entity 425 performs the operations of the transmitting RLC layers 220, 225 and 230.

At the transmitting node 420, the transmitting RLC entity 425 generates an RLC PDU [n] as a packet and then transmits the RLC PDU [n], as a first attempt (#1), to the transmitting MAC entity 421 in step 431. The symbol n denotes a serial number of the RLC PDU that the transmitting node 420 transmits. That is, RLC PDU [n] refers to a RLC PDU whose serial number is n. The transmitting MAC entity 421 generates a MAC PDU [n] from the received RLC PDU [n], and then transmits the MAC PDU [n], as a first attempt (#1), to the receiving node 410 in step 433. The MAC PDU [n] refers to a MAC PDU that is generated from the RLC PDU whose serial number is n.

At the receiving node 410, if the MAC PDU [n] does not contain an error, the receiving MAC entity 415 generates an RLC PDU [n] from the MAC PDU [n] and then transmits the RLC PDU [n] to the receiving RLC entity 411 in step 435. When the receiving RLC entity 411 receives the RLC PDU [n] during the first attempt, the receiving RLC entity 411 transmits a STATUS PDU ACK [n] to the transmitting node 420 in step 437. That is, the receiving RLC entity 411 transmits the STATUS PDU ACK [n] to the transmitting RLC entity 425 via the receiving MAC entity 415 and the transmitting MAC entity 421.

At the transmitting node 420, when a preset packet transmission time t has elapsed from the time point to transmit the RLC PDU [n], the transmitting RLC entity 425 generates an RLC PDU [n+1] as a packet and then transmits the RLC PDU [n+1], as a first attempt (#1), to the transmitting MAC entity 421 in step 441. The transmitting MAC entity 421 generates a MAC PDU [n+1] from the received RLC PDU [n+1] and then transmits the MAC PDU [n+1], as a first attempt (#1), to the receiving node 410 in step 443.

At the receiving node 410, if the MAC PDU [n+1] contains an error, the receiving MAC entity 415 generates the RLC PDU [n+1] from the MAC PDU [n+1] and then transmits the RLC PDU [n+1] to the receiving RLC entity 411 in step 445. If the RLC PDU [n+1] of the first attempt is lost, the receiving RLC entity 411 transmits a STATUS PDU NACK [n+1] signal to the transmitting node 420 in step 447. That is, the receiving RLC entity 411 transmits the STATUS PDU NACK [n+1] signal to the transmitting RLC entity 425 via the receiving MAC entity 415 and the transmitting MAC entity 421.

At the transmitting node 420, if the transmitting RLC entity 425 receives the STATUS PDU NACK [n+1], the transmitting RLC entity 425 re-transmits the RLC PDU [n+1], as a second attempt (#2), to the transmitting MAC entity 421 in step 449. The transmitting MAC entity 421 generates the MAC PDU [n+1] from the received RLC PDU [n+1] and then re-transmits the MAC PDU [n+1], as the second attempt (#2), to the receiving node 410 in step 451.

At the receiving node 410, if the MAC PDU [n+1] does not contain an error, the receiving MAC entity 415 generates the RLC PDU [n+1] from the MAC PDU [n+1] and then transmits the RLC PDU [n+1] to the receiving RLC entity 411 in step 453. When the receiving RLC entity 411 receives the RLC PDU [n+1] as the second attempt (#2), the receiving RLC entity 411 transmits a STATUS PDU ACK [n+1] signal to the transmitting node 420 in step 455. That is, the receiving RLC entity 411 transmits a STATUS PDU ACK [n+1] to the transmitting RLC entity 425 via the receiving MAC entity 415 and the transmitting MAC entity 421.

At the transmitting node 420, when a preset packet transmission time t has elapsed from the time point to transmit the RLC PDU [n+1], the transmitting RLC entity 425 generates an RLC PDU [n+2] as a packet and then transmits the RLC PDU [n+2], as the first attempt (#1), to the transmitting MAC entity 421 in step 461. The transmitting MAC entity 421 generates a MAC PDU [n+2] from the received RLC PDU [n+2] and then transmits the MAC PDU [n+2], as the first attempt (#1), to the receiving node 410 in step 463.

At the receiving node 410, if the MAC PDU [n+2] contains an error, the receiving MAC entity 415 transmits a HARQ NACK signal to the transmitting MAC entity 421 in step 465.

At the transmitting node 420, if the transmitting MAC entity 421 receives the HARQ NACK signal, the transmitting MAC entity 421 transmits the MAC PDU [n+2], as an m-th attempt (#m), to the receiving node 410 in step 467. The symbol m is equal to 2 or greater than 2. The symbol m may be a preset frequency of the HARQ NACK signal, i.e., equal to or less than a number j.

At the receiving node 410, if the MAC PDU [n+2] contains an error, the receiving MAC entity 415 transmits a HARQ NACK signal to the MAC entity 421 in step 469.

At the transmitting node 420, when the transmitting MAC entity 421 receives a HARQ NACK signal with respect to the MAC PDU [n+2] at the j-th attempt from the receiving MAC entity, the transmitting MAC entity 421 transmits a HARQ failure signal to the transmitting RLC entity 425 in step 471. When the transmitting RLC entity 425 receives the HARQ failure signal, the transmitting RLC entity 425 generates the RLC PDU [n+2] and transmits the RLC PDU [n+2], as the second attempt (#2), to the transmitting MAC entity 421 in step 473. The transmitting MAC entity 421 generates the MAC PDU [n+2] from the RLC PDU [n+2] and re-transmits the MAC PDU [n+2], as an (m+1)-th attempt, to the receiving node 410 in step 475.

At the receiving node 410, if the MAC PDU [n+2] does not contain an error, the receiving MAC entity 415 generates the RLC PDU [n+2] from the MAC PDU [n+2] and then transmits the RLC PDU [n+2] to the receiving RLC entity 411 in step 477. When the receiving RLC entity 411 receives the RLC PDU [n+2] during the second attempt (#2), the receiving RLC entity 411 transmits a STATUS PDU ACK [n+2] signal to the transmitting node 420 in step 479. That is, the receiving RLC entity 411 transmits the STATUS PDU ACK [n+2] signal to the transmitting RLC entity 425 via the receiving MAC entity 415 and the transmitting MAC entity 421.

At the transmitting node 420, when a preset packet transmission time t has elapsed from the time point to transmit the RLC PDU [n+2], the transmitting RLC entity 425 generates an RLC PDU [n+3] as a packet and then transmits the RLC PDU [n+3], as a first attempt (#1), to the transmitting MAC entity 421 in step 481. When the transmitting RLC entity 425 receives a STATUS PDU ACK signal, the transmitting RLC entity 425 transmits the RLC PDU [n+3] to the transmitting MAC entity 421.

In an exemplary implementation, when the receiving MAC entity 415 of the receiving node 410 receives the MAC PDU from the transmitting MAC entity of the transmitting node 420, the receiving MAC entity 415 determines whether packet loss occurs in the received MAC PDU. If the receiving MAC entity 415 ascertains that packet loss does not occur in the MAC PDU, the receiving MAC entity 415 transmits an RLC PDU to the receiving RLC entity 411. Otherwise, the receiving MAC entity 415 transmits a HARQ NACK signal to the transmitting MAC entity 421. The receiving MAC entity 415 may transmit a HARQ NACK signal to the transmitting MAC entity 421 until it receives a MAC PDU that does not contain an error. For example, the receiving MAC entity 415 may transmit the HARQ NACK signal to the transmitting MAC entity 421 from one time to less than j times.

In addition, the receiving RLC entity 411 of the receiving node 410 determines whether RLC PDU of a particular serial number is lost. If the receiving RLC entity 411 ascertains that the RLC PDU of a particular serial number is not lost, the receiving RLC entity 411 transmits a STATUS PDU ACK signal to the receiving MAC entity. Otherwise, the receiving RLC entity 411 transmits a STATUS PDU NACK thereto. The receiving RLC entity 411 may transmit a STATUS PDU NACK signal to the receiving MAC entity until it receives the RLC PDU of a corresponding serial number. Similarly, the transmitting RLC entity 425 of the transmitting node 420 may re-transmit the RLC PDU of a corresponding serial number until it receives a STATUS PDU ACK signal. Furthermore, when the transmitting RLC entity 425 receives a STATUS PDU ACK signal with respect to the RLC PDU of a corresponding serial number, the transmitting RLC entity 425 may transmit the RLC PDU of the next serial number.

Figure 5:
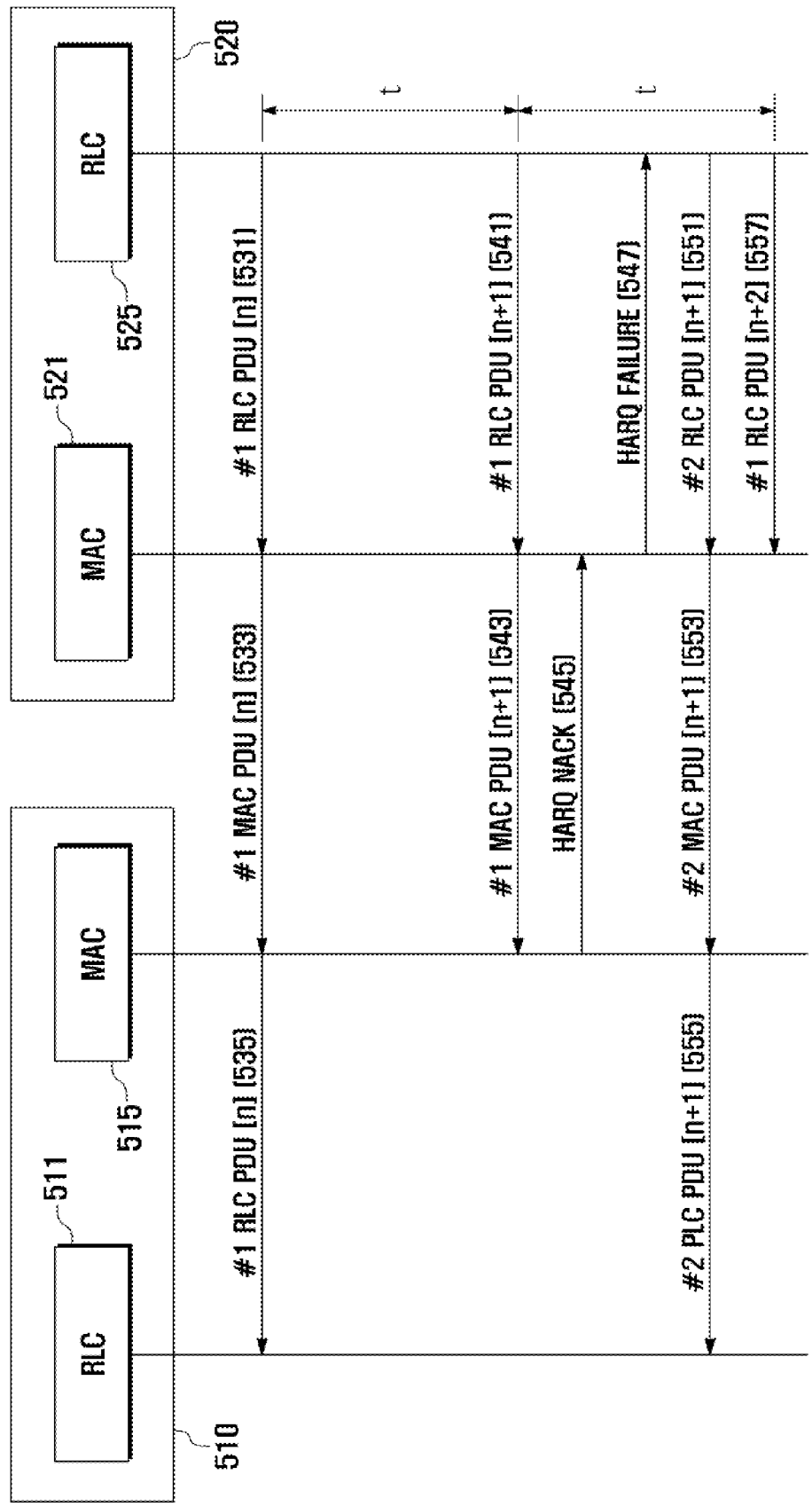
FIG. 5 is a signal flowchart describing a method for transmitting or receiving packets in a communication system according to an exemplary embodiment of the present invention.

FIG. 5 is a signal flowchart describing a method for transmitting or receiving packets in a communication system according to an exemplary embodiment of the present invention. In an exemplary implementation, it is assumed herein that the transmitting RLC layers 220, 225 and 230 or the receiving RLC layers 270, 275 and 280 are operated in a Half-acknowledged Mode (HM).

Referring to FIG. 5, when a transmitting node 520 transmits packets, according to a serial number, to a receiving node 510, the receiving node 510 receives the packets according to the serial number. At the receiving node 510, a receiving RLC entity 511 performs operations of the receiving RLC layers 270, 275 and 280, and a receiving MAC entity 515 performs the operation of the receiving MAC layer 260. Similarly, at the transmitting node 520, a transmitting MAC entity 521 performs the operation of the transmitting MAC layer 240, and a transmitting RLC entity 525 performs the operations of the transmitting RLC layers 220, 225 and 230.

At the transmitting node 520, the transmitting RLC entity 525 generates an RLC PDU [n] as a packet and then transmits the RLC PDU [n], as the first attempt (#1), to the transmitting MAC entity 521 in step 531. The symbol n denotes a serial number of the RLC PDU that the transmitting node 520 transmits. That is, the RLC PDU [n] refers to a RLC PDU whose serial number is n. The transmitting MAC entity 521 generates a MAC PDU [n] from the received RLC PDU [n], and then transmits the MAC PDU [n], as the first attempt (#1), to the receiving node 510 in step 533. The MAC PDU [n] refers to a MAC PDU that is generated from the RLC PDU whose serial number is n.

At the receiving node 510, if the MAC PDU [n] does not contain an error, the receiving MAC entity 515 generates an RLC PDU [n] from the MAC PDU [n] and then transmits the RLC PDU [n] to the receiving RLC entity 511 in step 535.

At the transmitting node 520, when a preset packet transmission time t has elapsed from the time point to transmit the RLC PDU [n], the transmitting RLC entity 525 generates an RLC PDU [n+1] as a packet and then transmits the RLC PDU [n+1], as the first attempt (#1), to the transmitting MAC entity 521 in step 541. The transmitting MAC entity 521 generates a MAC PDU [n+1] from the received RLC PDU [n+1] and then transmits the MAC PDU [n+1], as the first attempt (#1), to the receiving node 510 in step 543.

At the receiving node 510, if the MAC PDU [n+1] contains an error, the receiving MAC entity 515 transmits a HARQ NACK signal to the transmitting MAC entity 521 in step 545.

At the transmitting node 520, when the transmitting MAC entity 521 receives a HARQ NACK signal, the transmitting MAC entity 521 transmits a HARQ failure signal to the transmitting RLC entity 525 in step 547. When the transmitting RLC entity 525 receives the HARQ failure signal, the transmitting RLC entity 525 generates the RLC PDU [n+1] and re-transmits the RLC PDU [n+1], as the second attempt (#2), to the transmitting MAC entity 521 in step 551. The transmitting MAC entity 521 generates the MAC PDU [n+1] from the received RLC PDU [n+1] and re-transmits the MAC PDU [n+1], as the second attempt (#2), to the receiving node 510 in step 553.

At the receiving node 510, if the MAC PDU [n+1] does not contain an error, the receiving MAC entity 515 generates the RLC PDU [n+1] from the MAC PDU [n+1] and transmits the RLC PDU [n+1] to the receiving RLC entity 511 in step 555.

At the transmitting node 520, when a preset packet transmission time t has elapsed from the time point to transmit the RLC PDU [n+1], the transmitting RLC entity 525 generates an RLC PDU [n+2] as a packet and then transmits the RLC PDU [n+2], as the first attempt (#1), to the transmitting MAC entity 521 in step 557.

A detailed packet transmission procedure that is performed in the transmitting node 520 in the communication system according to an exemplary embodiment of the present invention is described below with reference to FIG. 6.

Figure 6:
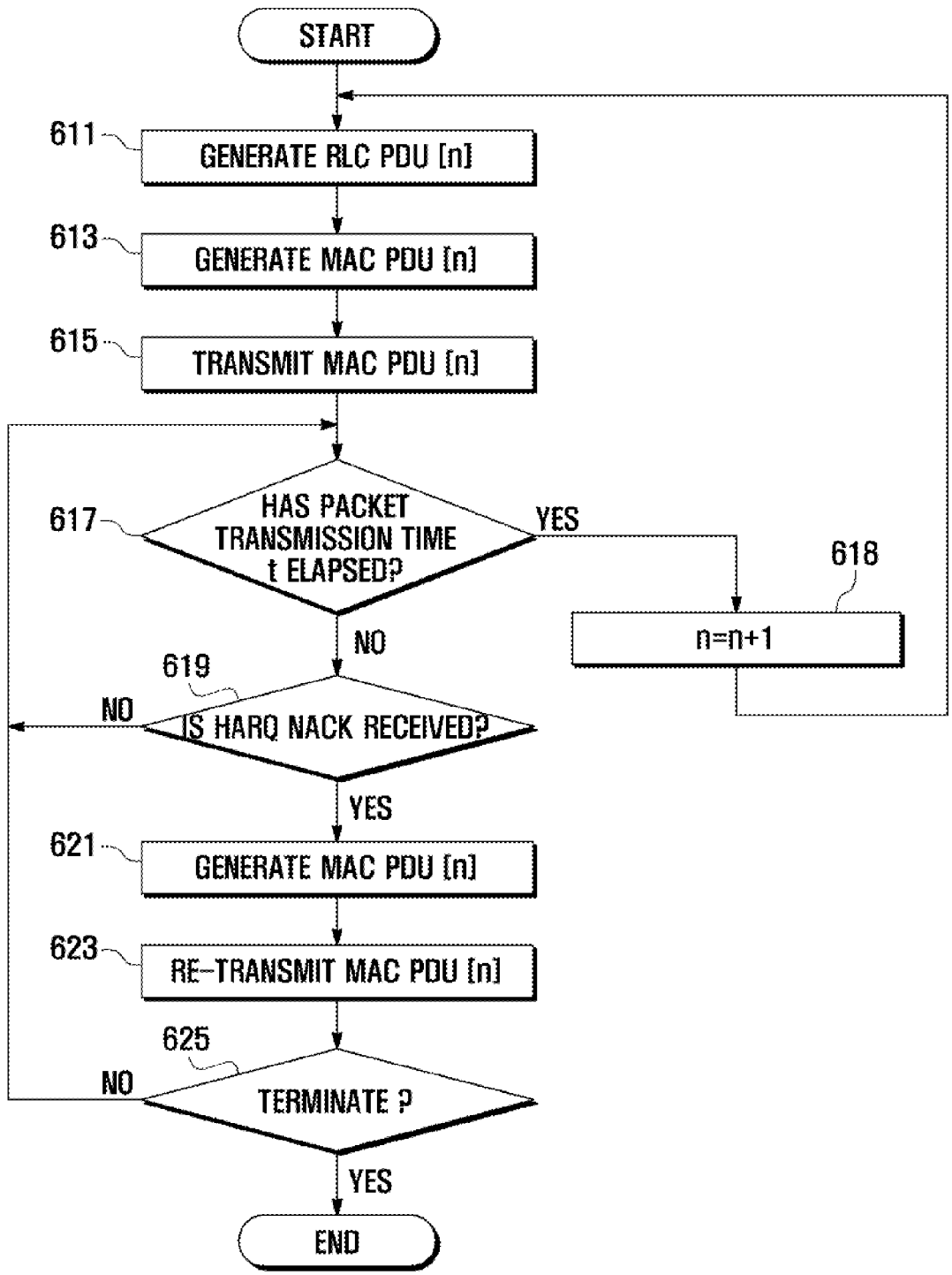
FIG. 6 is a flowchart describing a method for transmitting a packet in a transmitting node according to an exemplary embodiment of the present invention.

FIG. 6 is a flowchart describing a method for transmitting a packet in a transmitting node according to an exemplary embodiment of the present invention.

Referring to FIG. 6, the transmitting node 520 generates an RLC PDU [n] in step 611. The transmitting node 520 includes buffers for temporarily storing the RLC PDU [n]. The transmitting node 520 generates a MAC PDU [n] from the RLC PDU [n] in step 613. The transmitting node 520 performs transmission of the MAC PDU [n] in step 615 and determines whether a preset packet transmission time t has elapsed from a time point that the MAC PDU [n] has been transmitted in step 617. If the transmitting node 520 ascertains that a preset packet transmission time t has elapsed from a time point that the MAC PDU [n] has been transmitted in step 617, the transmitting node 520 increases a serial number of a packet from n to n+1 in step 618, and then returns to and proceeds with step 611.

However, if the transmitting node 520 ascertains that a preset packet transmission time t has not elapsed in step 617, the transmitting node 520 further determines whether to receive a HARQ NACK signal in step 619.

If the transmitting node 520 does not receive the HARQ NACK signal in step 619, the transmitting node 520 returns to step 617 where it determines whether a preset packet transmission time t has elapsed.

However, if the transmitting node 520 receives the HARQ NACK signal in step 619, the transmitting node 520 generates the MAC PDU [n] from the RLC PDU [n] that is temporarily stored in step 621. The transmitting node 520 regenerates the MAC PDU [n] from the RLC PDU [n] temporarily stored in the buffer. The transmitting node 520 performs re-transmission of the MAC PDU[n] in step 623.

The transmitting node 520 determines whether to terminate the packet transmission in step 625. If the transmitting node 520 ascertains that the packet transmission requires termination in step 625, the transmitting node 520 terminates the packet transmission procedure. However, if the transmitting node 520 ascertains that the packet transmission does not require termination in step 625, the transmitting node 520 returns to step 617 and then repeats steps 617 to 625.

A detailed packet reception procedure that is performed in the receiving node 510 in the communication system according to an exemplary embodiment of the present invention is described below with reference to FIG. 7.

Figure 7:
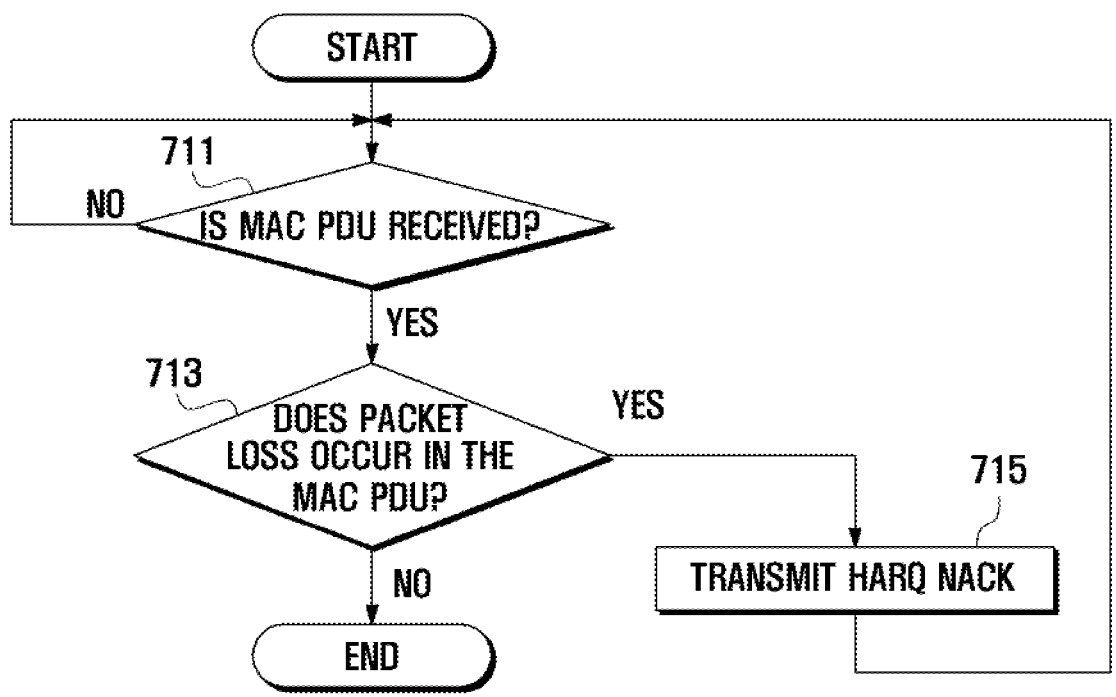
FIG. 7 is a flowchart describing a method for receiving a packet in a receiving node according to an exemplary embodiment of the present invention.

FIG. 7 is a flowchart describing a method for receiving a packet in a receiving node according to an exemplary embodiment of the present invention.

Referring to FIG. 7, the receiving node 510 receives the MAC PDU in step 711, and determines whether packet loss occurs in the MAC PDU in step 713. If the receiving node 510 ascertains that packet loss does not occur in the MAC PDU in step 713, the receiving node 510 terminates the packet reception procedure. However, if the receiving node 510 ascertains that packet loss occurs in the MAC PDU at 713, the receiving node 510 transmits a HARQ NACK signal to the transmitting node in step 715, and then returns to step 711.

As described above, if the packet loss does not occur in the MAC PDU transmitted from the transmitting node 520, the receiving node 510 does not perform an additional reply. However, if the packet loss occurs in the MAC PDU, the receiving node 510 transmits a HARQ NACK signal to the transmitting node 520. That is, since the receiving node 510 does not reply to the transmitting node 520, with respect to the MAC PDU, the communication system may reduce the time required to transmit or receive packets. That is, the communication system may avoid time delays when transmitting or receiving packets. The communication system may also prevent an overhead of various signals from generating. Furthermore, the transmitting RLC entity 525 of the transmitting node 520, instead of the transmitting MAC entity 521, may re-transmit packets. Accordingly, packets that are removed from the transmitting MAC entity 521 may be prevented. Therefore, the communication system may enhance quality of services and guarantee a high level of service.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for at least one of transmitting and receiving a packet in a communication system comprising a transmitting node and a receiving node, in which the transmitting node comprises a transmitting Radio Link Control (RLC) entity for performing an Automatic Repeat reQuest (ARQ) operation and a transmitting Medium Access Control (MAC) entity for performing a Hybrid Automatic ReQuest (HARQ) operation, the method comprising:
    transmitting the packet from the transmitting RLC entity to the receiving node via the transmitting MAC entity;
    transmitting a HARQ failure signal from the transmitting MAC entity to the transmitting RLC entity, if the transmitting MAC entity receives a HARQ Negative ACKnowledgment (NACK) signal from the receiving node; and
    re-transmitting the packet from the transmitting RLC entity to the receiving node via the transmitting MAC entity, if the transmitting RLC entity receives the HARQ failure signal,
    wherein the HARQ failure signal transmitted from the transmitting MAC entity to the transmitting RLC entity is a signal for re-transmitting the packet from the transmitting RLC entity of the receiving node, and
    wherein the transmitting of the packet and the re-transmitting of the packet from the transmitting RLC entity to the receiving node via the transmitting MAC entity are performed within a preset packet transmission time.

2. The method of claim 1, wherein the transmitting of the packets from the transmitting RLC entity to the receiving node comprises:
    generating, by the transmitting RLC entity, an RLC Packet Data Unit (PDU) from the packet and storing the PDU;
    transmitting the stored RLC PDU from the transmitting RLC entity to the transmitting MAC entity; and
    receiving, by the transmitting MAC entity, the RLC PDU, generating a MAC PDU from the received RLC PDU, and transmitting the MAC PDU to the receiving node.

3. The method of claim 2, further comprising:
    receiving, by the receiving node, the MAC PDU and generating, by a receiving MAC entity, the RLC PDU and transmitting the RLC PDU to a receiving RLC entity.

4. The method of claim 3, wherein the transmitting and the receiving of the packets are transmitted and received, respectively, according to a serial number.

5. The method of claim 3, wherein the re-transmitting of the packet from the transmitting RLC entity to the receiving node comprises:
    re-transmitting the stored RLC PDU from the transmitting RLC entity to the transmitting MAC entity; and
    receiving, by the transmitting MAC entity, the stored RLC PDU, generating the MAC PDU, and re-transmitting the MAC PDU to the receiving node.

6. The method of claim 5, further comprising:
    determining whether the packet, received by the receiving node, is lost.

7. The method of claim 6 further comprising transmitting from the receiving node to the transmitting MAC entity a HARQ ACKnowledgment (ACK) signal if the packet is not lost.

8. The method of claim 6, further comprising transmitting the HARQ NACK signal from the receiving node to the transmitting MAC entity if the received packet is lost.

9. A communication system for performing at least one of transmission and reception of a packet, the system comprising:
    a transmitting node comprising a transmitting Radio Link Control (RLC) entity for performing an Automatic Repeat reQuest (ARQ) operation;
    a transmitting Medium Access Control (MAC) entity for performing a Hybrid Automatic ReQuest (HARQ) operation, in which the transmitting RLC entity transmits the packet through the transmitting MAC entity; and
    a receiving node for receiving the packet from the transmitting node, for determining whether the received packet is lost, and for transmitting a HARQ Negative ACKnowledgment (NACK) signal to the transmitting MAC entity if the received packet is lost,
    wherein:
    the transmitting MAC entity receives the HARQ NACK signal and transmits a HARQ failure signal to the transmitting RLC entity,
    the transmitting RLC entity receives the HARQ failure signal and re-transmits the packet to the receiving node via the transmitting MAC entity, and
    the HARQ failure signal transmitted from the transmitting MAC entity to the transmitting RLC entity is a signal for re-transmitting the packet from the transmitting RLC entity of the receiving node, and wherein the transmitting of the packet and the re-transmitting of the packet to the receiving node via the transmitting MAC entity are performed within a preset packet transmission time.

10. The system of claim 9, wherein:

the transmitting RLC entity comprises buffers for generating an RLC Packet Data Unit (PDU) from the packet and storing the RLC PDU, if the packet is transmitted, and the transmitting RLC entity re-transmits the stored RLC PDU to the transmitting MAC entity, if the packet is re-transmitted.

11. The system of claim 10, wherein the transmitting MAC entity receives the stored RLC PDU, generates a MAC PDU from the received RLC PDU, and at least one of transmits and re-transmits the MAC PDU to the receiving node.

12. The system of claim 11, wherein the receiving node transmits to the MAC to the transmitting MAC entity a HARQ ACKnowledgment (ACK) signal if the packet is not lost.

13. A communication system for performing at least one of transmission and reception of a packet, the system comprising:

a transmitting node comprising a transmitting Radio Link Control (RLC) entity and a transmitting Medium Access Control (MAC) entity, wherein the transmitting RLC entity stores an RLC Packet Data Unit (PDU), transmits the RLC PDU to the transmitting MAC entity, and wherein the transmitting MAC entity receives the RLC PDU, generates a MAC PDU and transmits the MAC PDU; and a receiving node comprising a receiving MAC entity and a receiving RLC entity, wherein the receiving MAC entity receives the MAC PDU from the transmitting node, generates the RLC PDU and transmits the RLC PDU to the receiving RLC entity, wherein, the transmitting RLC entity re-transmits the stored RLC PDU to the transmitting MAC entity and the transmitting MAC entity re-transmits the MAC PDU to the receiving node, if the transmitting RLC entity receives a HARQ failure signal from transmitting MAC entity, wherein the HARQ failure signal is transmitted from the transmitting MAC entity to the transmitting RLC entity and is a signal for re-transmitting the packet from the transmitting RLC entity of the receiving node, and wherein the transmitting of the packet and the re-transmitting of the MAC PDU to the receiving node via the transmitting MAC entity are performed within a preset packet transmission time.

14. The system of claim 13, wherein the transmitting and the receiving of the packets are transmitted and received, respectively, according to a serial number.

15. The system of claim 13, wherein the transmitting RLC entity receives the HARQ failure signal from the transmitting MAC entity, if the transmitting MAC entity receives a HARQ Negative ACKnowledgment (NACK) signal from the receiving node.

16. The system of claim 13, wherein the transmitting MAC entity receives the HARQ NACK signal if the receiving node determines that the packet is lost.

17. The system of claim 16, wherein the receiving node transmits to the transmitting MAC entity a HARQ ACKnowledgment (ACK) signal if the packet is not lost.

* * * * *